May 8, 1962  J. ROSENKRANDS  3,033,586

INDEPENDENT FRONT WHEEL SUSPENSION

Filed July 22, 1960

INVENTOR.
Johannes Rosenkrands
BY
W. F. Uekgner
ATTORNEY

United States Patent Office 3,033,586
Patented May 8, 1962

3,033,586
INDEPENDENT FRONT WHEEL SUSPENSION
Johannes Rosenkrands, Detroit, Mich., assignor to General Motors Corporation, Detroit, Mich., a corporation of Delaware
Filed July 22, 1960, Ser. No. 44,647
1 Claim. (Cl. 280—96.1)

This invention relates to vehicle suspension and more particularly to independent suspension for dirigible wheels.

Production passenger vehicles for the past number of years have employed parallel transversely extending wishbone suspension arms wherein the lower arm is much longer than the upper arm. Although this type of suspension affords satisfactory geometric characteristics, serious design limitations result in terms of frame configuration and location of other vehicle components, such as the engine. Generally speaking, it is desirable that suspension arms be as short as possible; however, short suspension arms either induce an undesirable degree of scrub (tread change) or cause excessive camber change. Furthermore, the effective swing arm produced by parallel wishbone type suspensions constantly changes in length as the wheel is deflected upwardly or downwardly from the static load position. As a result, different vehicle standing heights resulting from load change cause undesirable variation in the vehicle roll center height and in the anti-dive characteristics.

The present invention overcomes all of the deficiencies noted while at the same time providing substantially increased space in the area normally occupied by the vehicle engine.

An object of the invention is to provide an improved independent front wheel suspension.

Another object is to provide an independent front wheel suspension having a relatively long effective swing arm for each wheel while utilizing actual swing arms which are exceptionally short.

Still another object is to provide an independent front wheel suspension comprising vertically spaced links which are pivotally mounted to the vehicle superstructure entirely outboard of the vehicle engine.

A still further object is to provide a structure of the stated character wherein the upper link oscillates about a substantially longitudinal axis, while the lower link oscillates about a substantially transverse axis.

Yet another object is to provide an independent wheel suspension having very short links but very low camber change and tread change.

These and other objects, advantages, and features of the invention will become more fully apparent as reference is had to the accompanying specification and drawing wherein.

Figure 1:
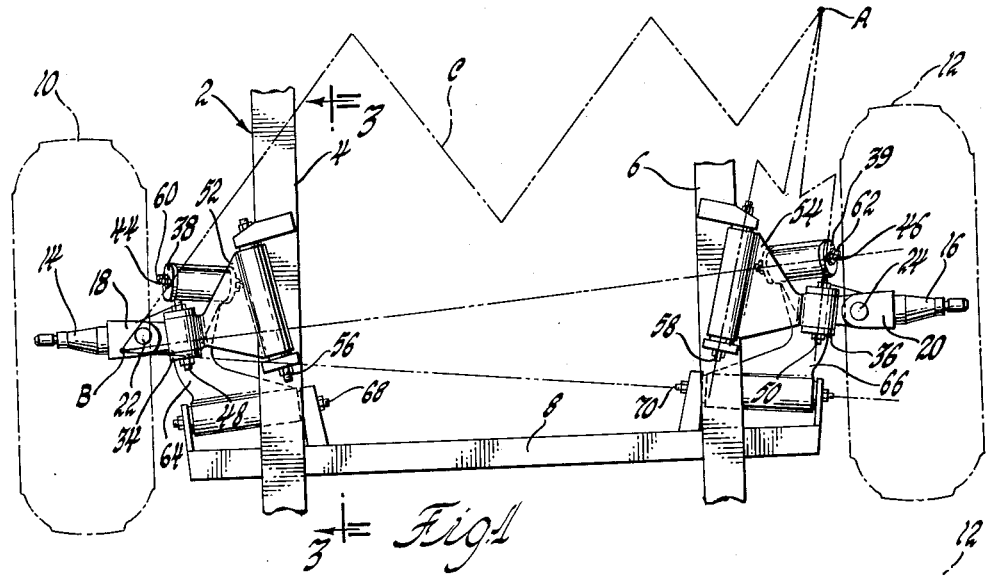
FIG. 1 is a partial plan view of a vehicle chassis incorporating independent front wheel suspension in accordance with the invention.
Figure 2:
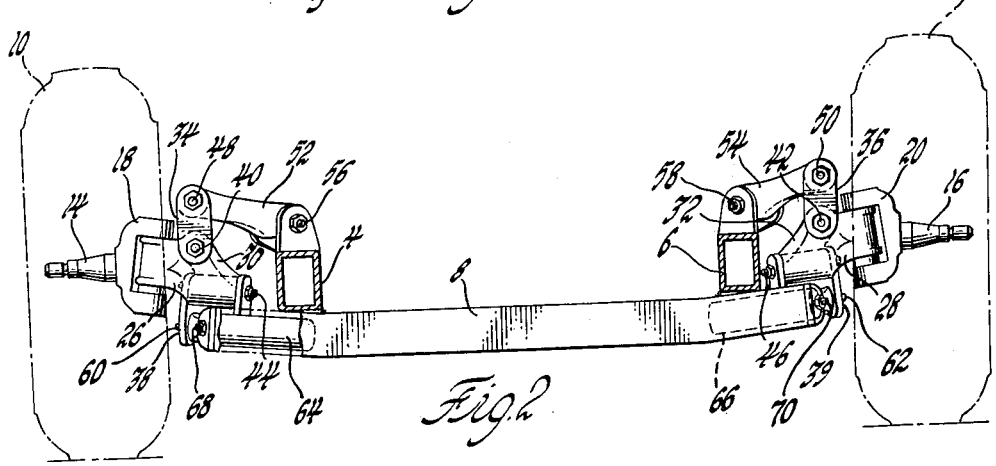
FIG. 2 is a front elevational view of the structure shown in FIG. 1.
Figure 3:
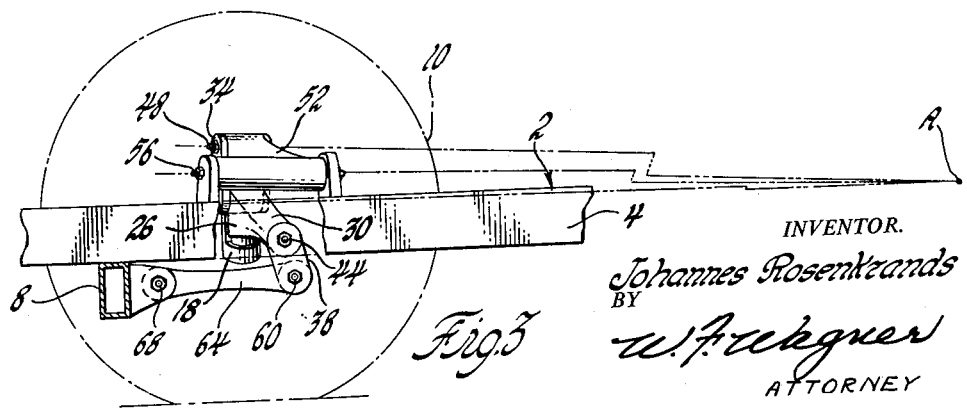
FIG. 3 is a sectional view of the structure taken on line 3—3 of FIG. 1.

Referring now to the drawings and particularly FIG. 1, the reference numeral 2 designates generally the vehicle frame or superstructure which includes a pair of side rail members 4 and 6 which are connected together by a forwardly disposed cross member 8. Disposed at opposite sides of frame 2 are a pair of dirigible wheels 10 and 12. As seen best in FIG. 2, wheels 10 and 12 are rotatably mounted on wheel spindles 14 and 16 formed integrally on wheel knuckles 18 and 20. Knuckles 18 and 20 in turn are dirigibly mounted by inclined king pins 22 and 24 to knuckle supports 26 and 28.

In accordance with the invention, knuckle supports 26 and 28 are formed with inboard ends 30 and 32 adapted for connection to upper shackle assemblies 34, 36 and lower shackle assemblies 38, 39. The lower ends of shackles 34 and 36 are connected to knuckle supports 30 and 32 by journal pins 40 and 42 which extend generally longitudinally, while the upper ends of shackle assemblies 38, 39 are connected to knuckle supports 30 and 32 by journal pins 44 and 46 which extend generally transversely. The upper ends of shackles 34 and 36 in turn are connected by journal pins 48 and 50 to the outboard ends of upper transverse control arms or links 52 and 54, the inboard ends of which are pivotally secured to frame side rails 4 and 6 by pivot shafts 56 and 58. The lower ends of shackles 38 and 39 in turn are pivotally connected by journal pins 60 and 62 to lower longitudinally extending control arms or links 64 and 66, the forward ends of which are pivotally mounted by shafts 68 and 70 to frame cross member 8.

In accordance with a feature of the invention, the projected axes of journal pins 40, 48, and shaft 56 and journal pins 42, 50, and shaft 58, respectively, converge on common points "A" rearwardly of the respective wheel associated therewith, while the projected axes of journal pins 44, 60, and shaft 68 and journal pins 46, 62, and shaft 70, respectively, converge on common points "B" inboard of the respective wheel associated therewith. As a result, the axis of motion of the effective swing arm of each wheel is defined by an imaginary line "C" passing through points A and B. Since these points of convergence occur a substantial distance rearwardly and inwardly of each wheel, the effective swing is greatly in excess of the actual length of either of the links associated with each wheel. Hence, the construction allows retention of the desired long effective swing arm during wheel deflection while eliminating the physical size and length heretofore required in conventional wishbone type suspensions. In addition to the above, alignment of the various cooperating journal pins and pivot shafts to converge on common points avoids binding or mechanical lock up of the wheel suspension linkage throughout its normal range of deflection and thus eliminates any need for expensive ball joints or other forms of universal joint connections in the suspension.

From the foregoing it will be seen that a simple and efficient suspension has been devised which not only retains all of the desirable geometric characteristics of conventional wishbone type suspension, but in addition allows substantial lowering of the frame side rails in the areas adjacent to the control arms and presents no obstacle to engine placement either fore and aft or vertically.

While but one embodiment of the invention has been shown and described, it will be apparent that other changes and modifications may be made therein. It is, therefore, to be understood that it is not intended to limit the invention to the embodiment shown, but only by the scope of the claim which follows.

What is claimed is:

Suspension linkage for attaching each of a pair of laterally spaced wheels to the sprung mass of a vehicle, each linkage comprising a longitudinally extending lever pivotally attached at its forward end to a transversely extending shaft fixed to said sprung mass, a transverse lever pivotally attached at its inboard end to a longitudinally extending shaft fixed to said sprung mass, a vertically extending wheel knuckle support, a first vertically extending shackle pivotally attached at its upper end to said knuckle and at its lower end to said longitudinal lever, and a second vertically extending shackle pivotally attached at its lower end to said knuckle and at its upper end to said transverse lever, the projected axes of the pivotal attachments of said first shackle and transverse shaft converging laterally inwardly at a common point adjacent the vertical midplane of the opposite wheel, and the projected axes of the pivotal attachments of said second shackle and longitudinal shaft converging at a common point adjacent the vertical midplane of and rearwardly of said wheel, whereby the imaginary oblique axis intersetcing both of said common points defines an effective swing arm for said wheel having a length approximately equal to the lateral distance between the linkages for each wheel.

References Cited in the file of this patent
UNITED STATES PATENTS

| | | |
|---|---|---|
| 2,131,661 | Heyermans et al. | Sept. 27, 1938 |
| 2,746,765 | McCutchen | May 22, 1956 |